United States Patent [19]

Pool et al.

[11] 4,002,319
[45] Jan. 11, 1977

[54] BI-DIRECTIONAL PRESSURE BALANCED VALVE

[75] Inventors: Eldert B. Pool, Pittsburgh, Pa.; Lalji J. Pavagadhi, Mission Viejo, Calif.

[73] Assignee: Rockwell International Corporation, Pittsburgh, Pa.

[22] Filed: Nov. 12, 1975

[21] Appl. No.: 631,286

[52] U.S. Cl. .......................... 251/282; 137/630.13; 137/630.15
[51] Int. Cl.² .......................................... F16K 1/32
[58] Field of Search ................. 137/630.13, 630.14, 137/630.15; 251/282

[56] References Cited
UNITED STATES PATENTS

| | | | |
|---|---|---|---|
| 2,200,226 | 5/1940 | Larson | 137/630.14 |
| 3,888,280 | 6/1975 | Tartaglia | 137/630.13 |

Primary Examiner—Robert G. Nilson

[57] ABSTRACT

An improved bi-directional pressure balanced valve includes a deflecting device at the axial opening in the closure disc to prevent an over balancing of the main valve disc assembly when fluid flow from the first flow passage impinges on the axial opening during closure of the valve. The preferred deflecting device includes a circular deflector plate which is mounted on the main disc to be centrally aligned with the axial opening and perpendicular thereto and having a diameter substantially larger than the diameter of the axial opening. The deflector plate is parallel with the lower surface of the main disc and it is separated therefrom to require fluid entering the axial opening to first flow between the lower surface and the deflector plate.

3 Claims, 3 Drawing Figures

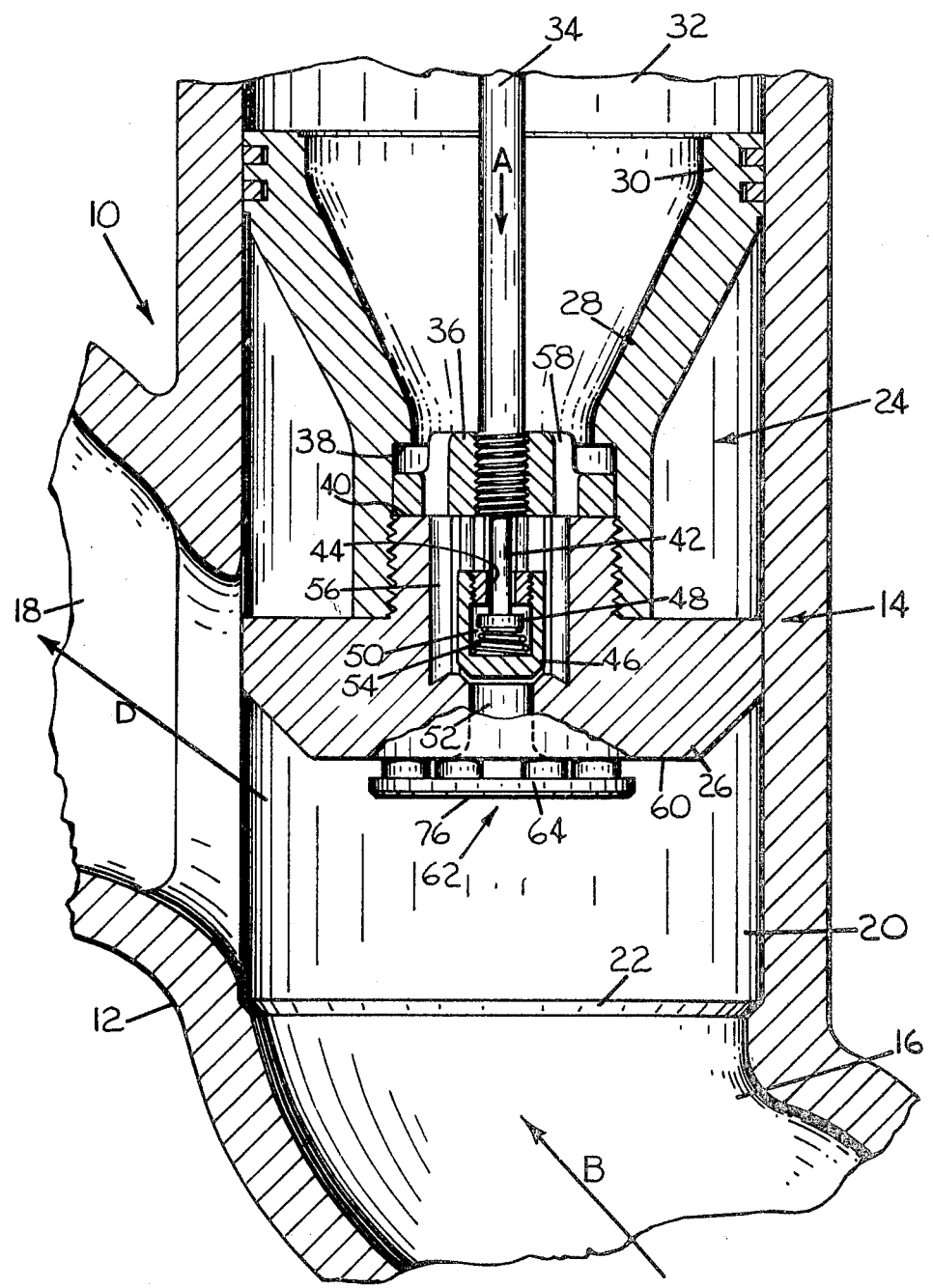
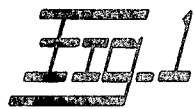

BI-DIRECTIONAL PRESSURE BALANCED VALVE

BACKGROUND OF THE INVENTION

1. Field of the Invention

This invention relates to a bi-directional pressure balanced valve and, more specifically, to such a valve which includes an axial opening through a main valve disc assembly which facilitates effective balanced operation of the valve and has been improved to prevent velocity pressure created by fluid flow from beneath the valve seat from interferring with effective balanced closure.

2. Prior Art of the Invention

There has heretofore been provided a large bi-directional pressure balanced valve of the type disclosed in U.S. Pat. No. 3,888,280 for use in high pressure fluid lines. The balanced configuration enable fail-safe closure of the valve regardless of the direction of the flow therethrough by a plurality of springs if an opening force of a pneumatic motor assembly is no longer energized to maintain the valve in an opened position. If the valve were not effectively balanced, the force needed to close the valve under adverse conditions, such as during a sudden line break, would require a significantly larger spring configuration which would be physically impractical to provide. To insure against valve damage during closure, a dashpot assembly controls the rate of closure by the springs to insure that it is maintained within an acceptable safe limit.

Although the valve of U.S. Pat. No. 3,888,280 has generally provided a satisfactory means for controlled prevention of fluid flow in either direction, it has been found that excessive pulldown forces can be generated when a large, 32-inch diameter value is closed under a particularly demanding flow condition. It might, for example, be necessary to close the valve against fluid flow from below the seat at about 1,000 p.s.i. inlet pressure with the outlet at zero pressure, as might occur with a line rupture. An analysis based on tests of a smaller model and using accepted engineering and analytical methods has indicated that the pulldown force generated on such a large valve under these extreme conditions could overload the dashpot and might result in its failure. Specifically, it was found that the 32-inch diameter balanced valve in an opened, lifted position 25¾ inches from the seat would be fully closed by a spring force ranging from 76,000 pounds to 45,000 pounds. However, if the total pressure produced in the dashpot were greater than 5,000 p.s.i., the integrity of the dashpot would be threatened and its ability to prevent valve damage would be impaired. According to the analysis, the undesired pulldown force produced by fluid flow acting on the valve during closure would be the greatest, 98,000 pounds, when the valve is about 19 inches from the seat. When this pulldown force is added to the spring force and resisting frictional forces are subtracted from the total, the expected dashpot pressure would exceed 7,000 p.s.i.

Although a larger and/or heavier dashpot assembly might be designed to satisfy this condition, there are other considerations which make this an unattractive alternative. The space presently provided the dashpot assembly within the operating mechanism for the valve is limited and physically relocating the springs or any other components of the mechanism would require extensive, complicated redesign. Because power plant safety requirements include seismic considertions and the ability of the valve and the pipes to withstand shock, it is also undesirable to increase the mass of the dashpot assembly, and thus the operating mechanism which extends in a cantilevered fashion from the pipes. Therefore, determining the cause of the excessive pulldown forces and providing for their reduction is most desirable.

The rapid fluid flow from beneath the seat produces a velocity pressure which is added to the static pressure of the fluid to produce a higher, stagnation pressure in an axial opening in the main valve disc assembly. The effect of the velocity pressure on the axial opening is then transmitted into the upper chamber of the valve body through the axial opening of the main valve assembly and unintentionally augments the static pressure needed to provide the desired balanced operation. It has been assumed that the resulting stagnation pressure acting on top of the main valve disc assembly which creates these excessive pulldown forces is not sufficiently opposed by a lesser total pressure from beneath the main disc which acts directly thereon because of the inclination of the inlet pipe, and thus the direction of fluid flow, with respect to the main disc. The velocity pressure apparently elevates the stagnation pressure within the isolated upper chamber of the body despite efforts during main valve closure to urge an auxiliary valve disc toward a closed position which could prevent flow through the axial opening.

SUMMARY OF THE INVENTION

It is an object of the present invention to include a bi-directional pressure balanced valve which will remain effectively balanced during closure by preventing velocity pressure of fluid flow from beneath the seat from producing an excessively over-balanced condition.

It is another object to provide a valve of the type described which includes a flow deflecting device to prevent impingement of the fluid flow on an axial opening through the main valve disc assembly which opening facilitates communication of opposite sides of the valve disc assembly.

It is still another object to provide a valve of the type described in which the flow deflecting device includes a deflector plate in fixed, spaced relationship from the lower surface of the main disc.

It is a further object to provide a valve of the type described in which a deflector plate of the flow deflecting device can be inexpensively, effectively and reliably mounted on the main disc.

These and other objects of the invention are achieved in a preferred embodiment thereof in the form of an improved bi-directional pressure balanced valve of the type which includes a body having a cylindrical valve chamber and a pair of flow passages intersecting a power portion of the valve chamber. An annular valve seat is between the lower portion and a first one of the flow passages and coaxially aligned with the cylindrical valve body. A main valve disc assembly is mounted for axial movement within the cylindrical valve chamber for selective engagement of a main disc thereof with the seat and further includes a concentric hollow shaft member extending from the main disc away from the seat to terminate at a piston fitting which is slidably received within an upper portion of the cylindrical valve chamber. A coaxially aligned valve stem extends from an operating mechanism located above the valve through the upper portion, the piston fitting and the hollow shaft member to terminate at an auxiliary valve disc. There is included a means for communicating a region above the disc assembly with a region below the main disc to substantially control fluid forces acting on the opposite sides of the main valve disc assembly to facilitate opening and closing of the valve regardless of the direction of fluid flow through the valve. The means for communicating includes predetermined axial positioning of the auxiliary valve disc during the operation of the valve stem to open and close an axial opening through the main valve disc assembly. The improvement includes means for preventing the fluid flow from the first flow passage from impinging on the axial opening of the main valve disc assembly during closure of the valve to reduce the effect of velocity pressure on the axial opening.

BRIEF DESCRIPTION OF THE DRAWINGS

FIG. 1 is a fragmentary side elevation, partially in section, of the preferred valve including various features of the invention.

DETAILED DESCRIPTION OF THE PREFERRED EMBODIMENT

Figure 2:
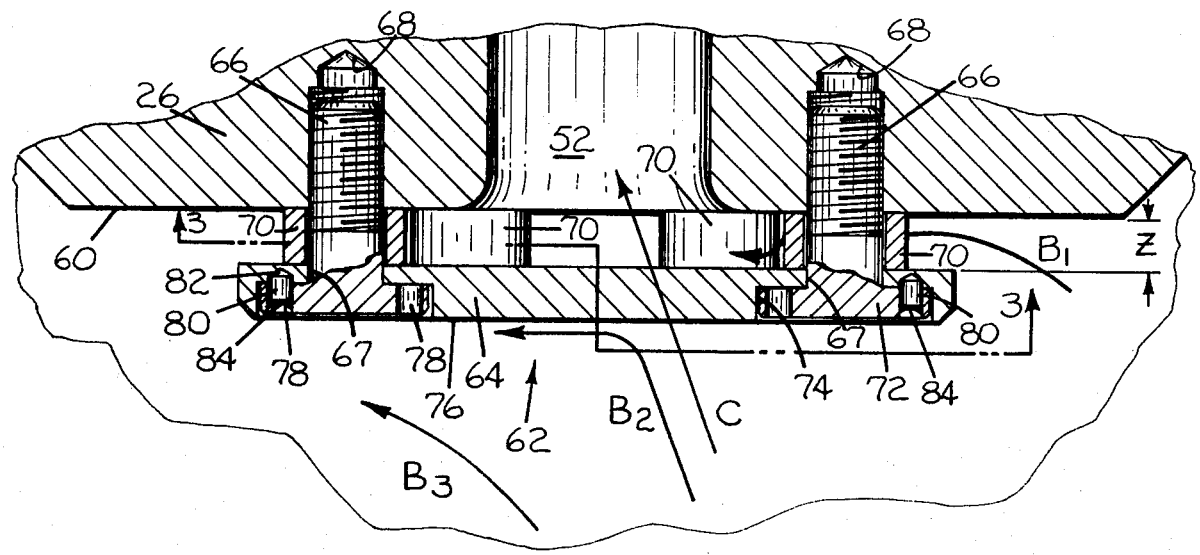
FIG. 2 is an enlarged, fragmentary view, partially in section, of the preferred flow deflecting device of the valve of FIG 1.

As seen in FIG. 1, a preferred bi-directional pressure balanced valve 10 of the present invention includes a body 12 having a cylindrical valve chamber 14 and a pair of flow passages 16 and 18 intersecting a lower portion 20 of the cylindrical valve chamber 14. An annular valve seat 22 is between the lower portion 20 and the flow passge 16 and is coaxially aligned with the cylindrical valve chamber 14. The valve 10 represents the preferred embodiment of the invention and is similar to the embodiments disclosed in U.S. Pat. No. 3,888,280 but has been improved to include additional features according to the present invention. Other changes in the valve configuration simply represent what is presently preferred but does not alter the basic teaching of U.S. Pat. No. 3,888,280 which is incorporated herein by reference. It will be apparent to those skilled in the valve art that the present invention will be applicable for utilization on the specific embodiments shown therein and any other bi-directional pressure balanced valves having a different configuration, but nevertheless operating in a similar manner.

A main valve disc assembly 24 is mounted within the cylindrical valve chamber 14 for axial movement for selective engagement of a main disc 26 thereof with the seat 22. The main valve disc assembly 24 also includes a concentric hollow shaft member 28 which extends from the main disc 26 away from the seat 22. A piston fitting 30 of the assembly 24 is provided at the extended end of the hollow shaft member 28 for sliding, relatively sealed movement within an upper portion 32 of the cylindrical valve chamber 14.

A valve stem 34 extends from an operating mechanism (not shown) located above the cylindrical valve chamber 14 into and through upper portion 32, the piston fitting 30 and the hollow shaft member 28. The preferred operating mechanism, as disclosed in U.S. Pat. No. 3,888,280, includes a pneumatic motor assembly, a dashpot assembly and a plurality of springs which are capable of applying a spring force to the stem 34 for closure of the valve 10, in a direction as indicated by the arrow A. A collar 36 is mounted at a longitudinally fixed position on stem 34 between opposed engaging surfaces 38 and 40 of the hollow shaft member 28 and the disc 26, respectively. The stem 34 continues through the collar 36 to terminate at an extended end 42 thereof. The extended end 42 of the stem 34 extends through an opening 44 of an auxiliary valve disc 46. An enlarged portion 48 of the extended end 42 is received within a cavity 50 of the auxiliary valve disc 46 for retention of the auxiliary valve disc 46 on the extended end 42 of the stem 34 throughout valve operation.

As seen in FIG. 1, the main valve disc assembly 24 is being closed by the spring force and is at the general location mentioned hereinabove at which the undesired maximum pulldown force had been experience). The downward movement of the stem 34 causes the collar 36 to act on the surface 40 of the main disc 26 moving the main valve disc assembly toward the seat 22. During downward movement against fluid flow from the inlet passage 15 (as indicated by arrow B), the fluid pressure beneath the disc 26 in the lower portion 20 is intended to pass through the main valve disc assembly 24 by way of an axial opening 52 therethrough to maintain the upper portion 32 generally at the same fluid pressure as that below for effective balanced closure. A spring 54 allows upward movement of the auxiliary valve disc 46, in a check valve fashion, so that fluid communicates around the auxiliary valve disc at 56 and continues through openings 58 in the collar 36 and into the upper portion 32.

However, as seen in FIG. 2 of an enlarged fragmentary view of the main disc 26 and axial opening 52 therethrough, were it not for the present invention, fluid flow from beneath the seat 22 during closure would impinge on the axial opening 52 as shown by the arrow C. The velocity pressure of flow in the direction of C is added to the fluid static pressure to produce a stagnation pressure in the axial opening which was apparently transmitted around the auxiliary valve disc 46 and into the upper portion 32 of the cylindrical valve chamber 14. The resulting stagnation pressure in the upper portion 32 of the cylindrical valve chamber 14 created the excessive pulldown force mentioned hereinabove as the piston fitting 30 generally prevented leakage around the main valve disc assembly 24. The inclination of fluid flow with respect to the lower surface 60 of the main disc 26 produced a resulting pressure from beneath the main disc 26 which was insufficient to match the pressure in upper portion 32 allowing the pulldown forces to be produced. Therefore, prior to the present invention, as the valve closed and flow continued past the disc as indicated by arrow D in FIG. 1, the pulldown force generated was sufficient to endanger the dashpot assembly and its ability to prevent valve damage during closure.

To reduce the effect of the velocity pressure on the axial opening 52, a deflecting device 62 of the present invention has been provided. The deflecting device 62 preferably includes a deflector plate 64 which is secured at the lower surface 60 of the main disc 26 in general alignment with the axial opening 52. Although the deflecting device 62 might be provided in a number of different forms or shapes or mounting means to locate a rigid structure in alignment with the axial opening 52 to effectively deflect the path of the fluid flow from the flow passage 16 from direct impingement on the axial opening, the deflecting plate 64 is preferred for reasons which will be discussed hereinbelow.

Figure 3:
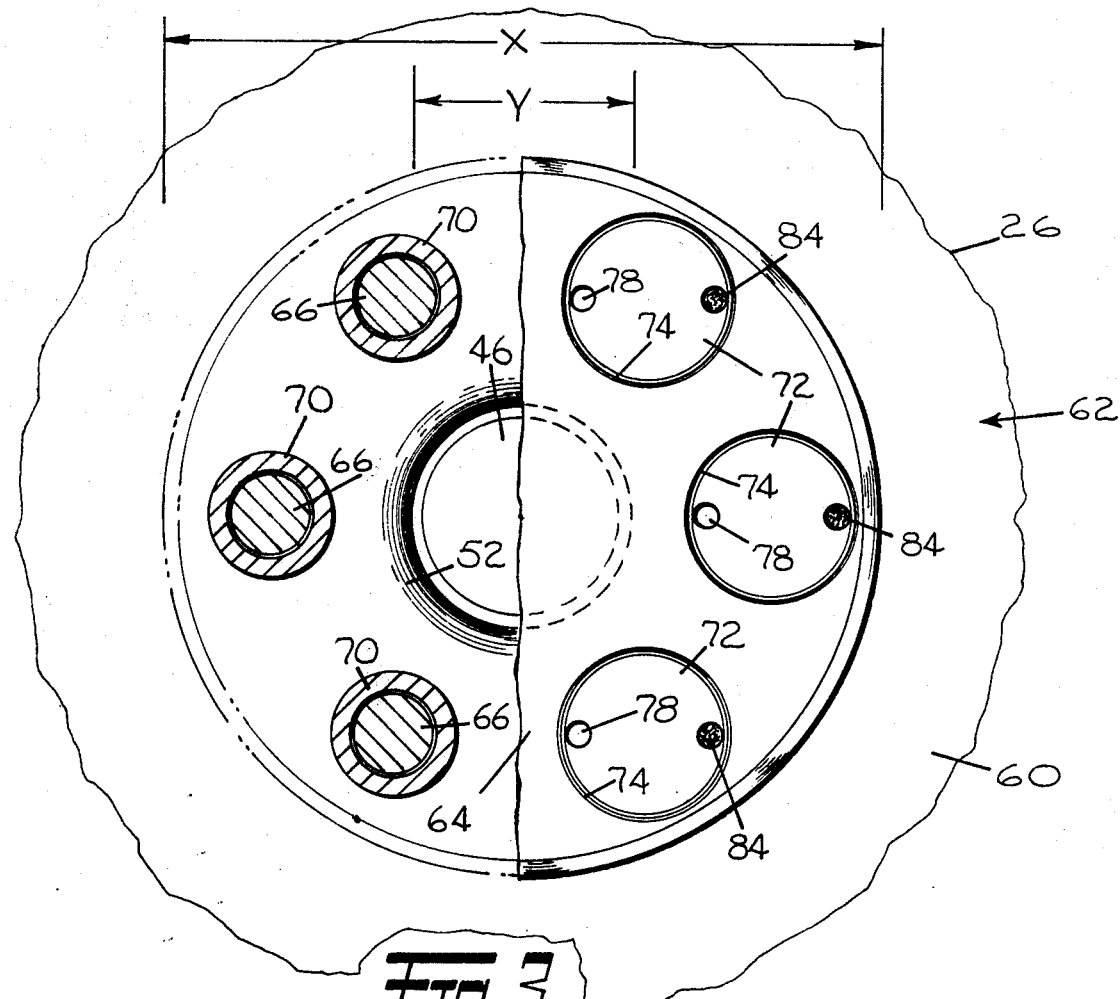
FIG. 3 is a view as seen along line 3—3 of FIG. 2.

As seen in FIGS. 2 and 3, the deflector plate 64 is circular, has diameter X and is centrally aligned with the opening 52 having a diameter Y. The deflector plate 64 is mounted by a plurality of bolts 66, six in the preferred embodiment, which extend through openings 67 in the deflector plate 64 and are received in matching, threaded holes 68 in the lower surface 60 of the main valve 26. The bolts 66 and openings 67 are evenly spaced around the deflector plate 64 so that the entire main valve disc assembly 24 will be free to rotate without altering the function of the deflecting device 62. The deflector plate 64 is maintained generally parallel with and separated from the lower surface 60, at a distance Z, by providing a spacing tube 70 to encircle each bolt 66 as its opposite ends make contact with the lower surface 60 and the deflector plate 64, respectively.

The deflector plate 64 is maintained in the above described position by preventing any rotation of the bolts 66 after assembly. Each bolt 66 includes an enlarged head 72 adapted for receipt within a recessed area 74 of the outer surface 76 of the deflector plate 64. A pair of holes 78 near the periphery of the enlarged head 72 allows a tool to be utilized for tightening the bolt 66 during assembly. Once tightened, a drill is inserted into one of the holes 78 to form an aligned hole 82 in the base of the recess 74. A pin 80 is then inserted into the hole 78 and aligned hole 82 to prevent undesired rotation and removal of the bolt 66 from its hole 68 and is plug welded at 84 to insure that it will remain in position throughout valve operation. The above described mounting configuration is preferred because of the reliable means by which the deflector plate 64 is maintained at the desired separated position relative the lower surface 60 of main disc 26. Another mounting means, such as welding a plate to the lower surface 60, might be alternatively employed and would still be within the scope of the present invention. However, this is not preferred because these valves are often utilized in nuclear power plants which demand rigid quality control requirements for all pressure containing components used therein. Welding to the main disc requires more complicated and extensive testing to satisfy these requirements than does the drilling of holes 68.

With the preferred deflector plate 64 installed, fluid flow from the inlet passage 16, at the previously critical position shown in FIG. 1 is prevented from impinging on the axial opening 52. Fluid flow around the deflector plate 64 can be assumed to include one of at least three different forms. Flow in the direction of B1 would pass between the lower surface 60 of the main disc 26 and the deflector plate 64 in a direction generally parallel therewith to provide fluid access to the axial opening 52 without allowing the full effect of velocity pressure to act thereon. Flow B2 which is generally aligned with the axial opening 52 is now deflected by the outer surface 76 of the deflector plate 64. Flow B3 would generally flow by the deflector plate 64 toward the outlet passage 18 but would be expected to act on the main disc 26 in a manner similar to flow acting on main disc 26 in a region remote from axial opening 52 prior to the addition of the deflecting device 62 of the present invention.

For the 32-inch valve which was the subject in the analysis discussed hereinabove, it should be kept in mind that the diameter Y of the axial opening 52 was about 4.25 inches while the main disc 26 had a diameter of about 29.5 inches. It has been determined that the preferred diameter X for deflector plate 64 of the present invention should be about 13 inches or about 3 times as large as diameter Y for the axial opening 52. The space Z between lower surface 60 and the deflector plate 64 was preferably about 1 inch or ¼ the diameter Y. The analysis for this preferred configuration indicates that during closure of the preferred large valve 10 pulldown forces are substantially reduced so that the pressure within the dashpot would be maintained below about 4,100 p.s.i., throughout closure. Although the dimensions for diameter X and distance Z mentioned above were utilized in the analysis, to substantially reduce the effect of the velocity pressure it can be assumed from a comparison of flows B1, B2 and B3 and flow C shown in FIG. 2 that some beneficial reduction of the effect of the velocity pressure could still be accomplished if the diameter X were decreased but were still larger than the diameter Y of the axial opening 52. Similarly, if the distance Z were enlarged to be about equal to the diameter Y, the effect of the velocity pressure on the axial opening 52 could still be advantageously reduced.

It should be apparent to those skilled in the valve art that the present invention, although having obvious application for the larger valves on which greater pulldown forces can be generated, can also be effectively utilized to improve the design of smaller valves by decreasing the size and/or weight requirements of the operating mechanism. It should also be clear that a deflecting device 62 might be of a different form from that of the preferred embodiment shown hereinabove without departing from the spirt and scope of the invention as those skilled in the art will readily understand.

What is claimed is:

1. In a bi-directional pressure balanced valve of the type which includes a body having a cylindrical valve chamber and first and second flow passages intersecting a lower portion of said cylindrical valve chamber at different axial positions, an annular valve seat between said flow passages and above said second flow passage, a main valve disc assembly slidably supported within said cylindrical valve chamber for axial movement between a closed position sealingly engaging the valve seat and an open position spaced therefrom substantially above both flow passages, said disc assembly defining thereabove a sealed upper chamber, means including a valve stem extending through the upper chamber and operatively connected to the disc assembly for moving the latter between said positions, an axial opening through the disc assembly fluidly communicating the upper chamber with the flow passages, normal fluid flow being from said first flow passage past the valve seat to the second passage with the opening being substantially isolated from fluid velocity pressure thereat whereby only static pressure is communicated to the upper chamber, abnormal fluid flow being from the second flow passage to the first passage with the opening being directly exposed to fluid velocity pressure which is communicated to the upper chamber establishing a pressure differential on the disc and exerting a closing force thereon directed toward the valve set, means to substantially control fluid forces acting on the opposite sides of said main valve disc assembly to facilitate opening and closing of said valve regardless of the direction of fluid flow through said valve; the improvement comprising:

a flow deflecting device carried by the disc assembly below the opening for preventing the opening from being directly exposed to fluid velocity pressure during said abnormal fluid flow from said second flow passage to said first flow passage and thereby reducing the effect of velocity pressure increasing the pressure in the upper chamber and establishing said pressure differential on the disc and exerting said closing force thereon.

2. The valve as recited in claim 1, wherein said flow deflecting device includes a circular deflector plate centrally aligned with said axial opening and perpendicular thereto, said plate having a diameter larger than a diameter of said axial opening, and being disposed parallel with a lower surface of said disc assembly and separated therefrom so as to require fluid entering said axial opening to first flow between said lower surface and said deflector plate in a direction generally parallel therewith.

3. The valve as set forth in claim 2, wherein said diameter of said deflector plate is at least three times as large as said diamter of said axial opening and said deflector plate is separated a distance of about one-fourth of said diameter of said axial opening from said lower surface to substantially reduce said effect of said velocity pressure.

* * * * *